W. F. NICHOLS.
VIBRATION ARRESTER.
APPLICATION FILED OCT. 25, 1907.

949,962.

Patented Feb. 22, 1910.

Witnesses:

Inventor:
William F. Nichols
by Buckley Durand & Drury
his Attorneys

UNITED STATES PATENT OFFICE.

WILLIAM F. NICHOLS, OF CHICAGO, ILLINOIS.

VIBRATION-ARRESTER.

949,962.  Specification of Letters Patent.  Patented Feb. 22, 1910.

Application filed October 25, 1907. Serial No. 399,091.

*To all whom it may concern:*

Be it known that I, WILLIAM F. NICHOLS, a citizen of the United States of America, and resident of Chicago, Cook county, Illinois, have invented a certain new and useful Improvement in Vibration-Arresters, of which the following is a specification.

My invention relates to improvements in anti-vibrators, and has for its object the production of a device by means of which the vibrations of a gas lamp or other like structure are taken care of, thereby preventing the breakage of the globes.

A further object is the production of a device that can be readily attached to ordinary globes and arms without changing the existing conditions.

A further object is the production of a cheap and economical device, and one that is not liable to become disarranged.

These and such other objects as may hereinafter appear are attained by my device, an embodiment of which is illustrated in the accompanying drawing, in which—

Figure 1:
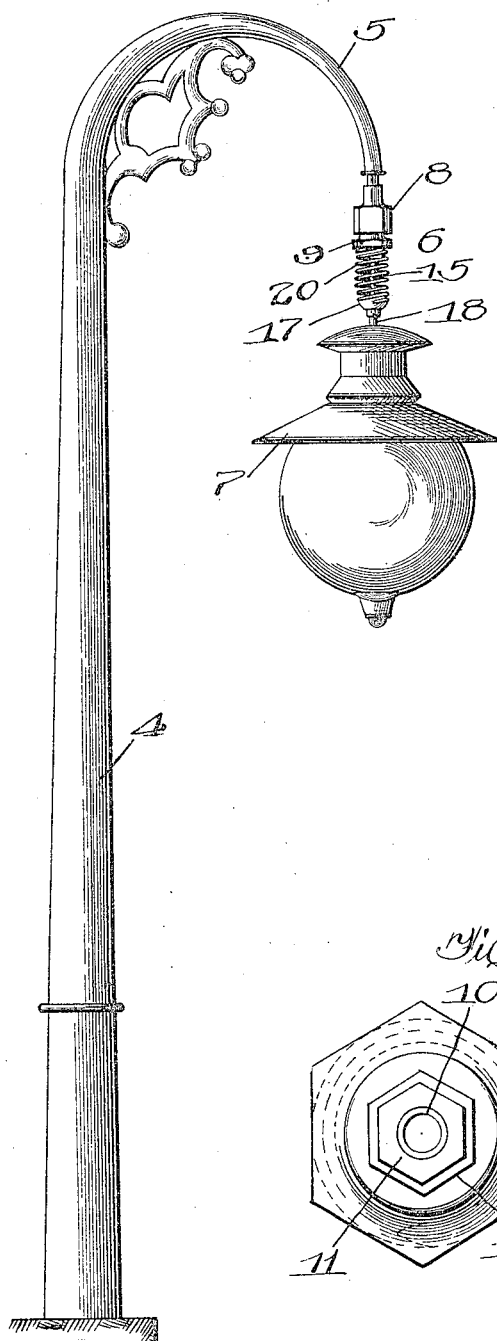
Figure 2:
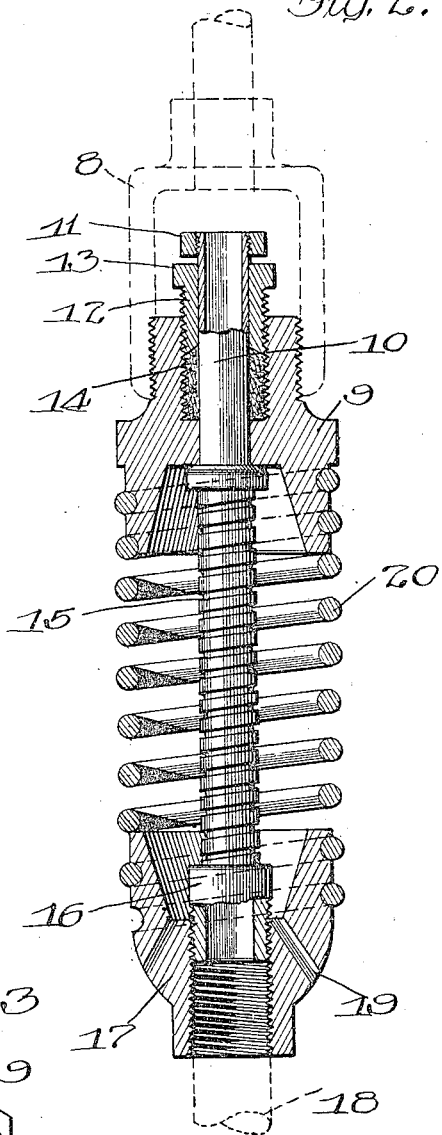
Figure 3:
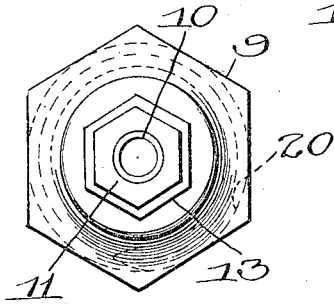

Figure 1 represents a perspective view of a gas lamp in place on a post equipped with my device. Fig. 2 is an enlarged sectional view through the center of my device, with parts shown in elevation. Fig. 3 is a top plan view of the device shown in Fig. 2.

Like numerals of reference indicate like parts in the several figures of the drawings.

Referring now to the drawing—4 represents an ordinary gas lamp post terminating in a goose-neck 5 to the end of which is secured my device 6, securing a globe and hood 7 to the goose-neck.

Referring now to Fig. 2,—8 represents an ordinary reducer attached to the bottom of the goose-neck within which is screwed a combined spring support and stuffing box 9. A tube 10 extends through the stuffing box and terminates in an annular shoulder 11 formed by screwing a ring on top of the tube. A screw collar 12 surrounds the tube 10, terminating in an annular seat 13 adapted to screw into the stuffing box and against the packing 14. Soldered to the lower end of the tube 10 is a flexible metallic tube 15 terminating in a screw portion 16 adapted to screw into the interiorly threaded base 17. A gas pipe 18 connects the base 17 with the lamp proper. The base is provided with a plurality of downwardly extending openings or channels 19 to prevent the accumulation of moisture within the base. The upper spring support 9 is provided with exterior threads within which the coil spring 20 is adapted to screw, and the upper portion of the base 17 is also similarly threaded and adapted to receive the lower end of the spring 20. The spring is located in place in the base and spring support in any well known manner.

It has been found, in practice, that the securing of gas lamp globes, especially those for use in exposed positions, results in a large breakage due to the vibration caused by traffic, wind, etc. This is necessarily the case when the connection between the globe and the support is rigid. By the use of my device, however, in which a flexible metal tube is used in connection with a coiled spring, the vibrations caused by wind or other agents are taken up, as it were, by the spring and the tube, and not directly transmitted to the globe itself. The weight of the globe, hood, etc., is not brought directly on the flexible tube, but a great portion of the strain is taken care of by the coiled spring. The end of the tube 10 projects upwardly through the stuffing box, and considerable play is left between the seat 13 and the shoulder 11, allowing sufficient longitudinal movement incident to the weight of the device. The base is also provided with a discharging means, thereby preventing any accumulation of dirt or moisture therein, with a consequent rusting of the connection between it and the tube.

Another important feature in my invention is the fact that this device can be used regardless of the weight of the lamp structure. In the event that the lamp is moved, the tube 10 is pulled downwardly within the stuffing box. Any undue pull is, of course, resisted by the spring, and at the same time the shoulder 11 serves as a stop when the limit of the device is reached. If the spring is of insufficient stiffness or strength, the shoulder 11 prevents the lamp from becoming detached, while at the same time there is considerable play in the reducer to compensate for the different weights of the globe, lamp, etc.

I claim:

As a new article of manufacture, a combined support and stuffing box, a base, a coiled spring removably secured to the said members, a flexible tube connection extending therebetween, and means for permitting the endwise movement of said connection, comprising a tubular extension adapted to slide within said stuffing box, together with a shoulder for limiting the movement of said extension, said base being provided with openings permitting the escape of material therefrom.

Signed by me at Chicago, Illinois, this 21st day of October, 1907.

WILLIAM F. NICHOLS.

Witnesses:
  SARAH LEWIS,
  F. H. DRURY.